Sept. 7, 1948.  C. L. McGOVNEY  2,448,724
NASAL FILTER
Filed April 2, 1946
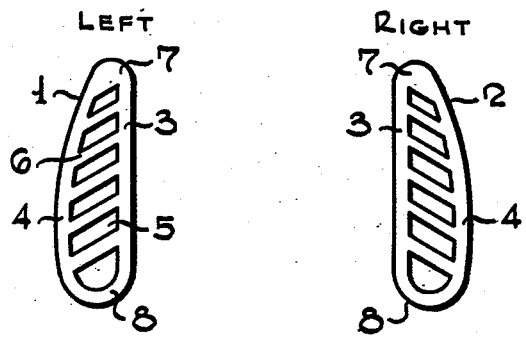
Fig.-1
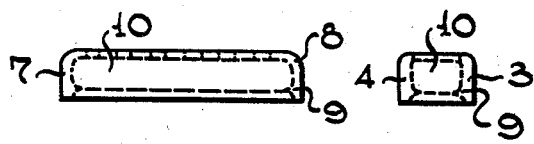 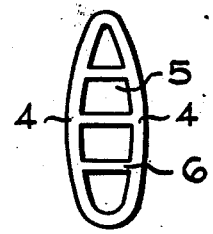
Fig.-2  Fig.-3  Fig.-4
Fig.-5
Clarence L. McGovney Inventor
By W. H. Smyers  Attorney Patented Sept. 7, 1948

2,448,724

UNITED STATES PATENT OFFICE 2,448,724

NASAL FILTER

Clarence L. McGovney, Elizabeth, N. J.

Application April 2, 1946, Serial No. 659,068

8 Claims. (Cl. 128—148)

This invention relates to a nasal filter adapted to be placed inside each nostril of the person using same, and adapted to remove pollen and dust particles from inhaled air, to give relief to persons suffering from hay fever, asthma and other allergies and to filter air for persons who work in atmospheres containing fine irritating particles.

Heretofore, a number of different types of nasal filters have been suggested, and some have even reached the stage of commercial use, but these prior art filters all have one or more disadvantageous features. For instance those made of metal are generally so hard and rigid that substantial injury to the nose results in case of accidental bumps on the nose, and frequently such metal filters cause irritation of the skin or inner membrane of the nose coming in contact therewith. Some nasal filters have been made of plastic materials, but generally such materials are too rigid to conform themselves to the inner contour of the nostril, and therefore either do not obtain a tight fit or else cause irritation.

Another difficulty is that some prior art nasal filters have used cotton pads, but when cotton becomes moist it wads up very easily and makes breathing difficult. Sometimes an oil such as a pine oil or a heavy mineral oil is supplied to the cotton, but such an oil would cause softening and deterioration of most non-metallic materials from which a nasal filter might be made.

The present invention solves the above mentioned and other difficulties of the prior art by providing a nasal filter of special design and made of moulded flexible and at least substantially elastic oil resistant composition which can be compounded in any desired color shade to match the flesh color of the nose of the person using same. Inside this flexible nasal filter there is placed a loose pad or wad of suitable filtering aid which is preferably lambs' wool coated with a thin film of petrolatum.

The preferred material for making the nasal filter of this invention is vulcanized synthetic rubber of the GR-N type, which is ordinarily made by emulsion polymerization of butadiene containing about 20 to 40%, ordinarily about 25 to 35% by weight of acrylonitrile. Other types of oil-resistant synthetic rubber may be used such as neoprene which is a polymerized chlorprene, or other types of products such as an organic polysulfide synthetic rubber. Vulcanized natural rubber may be used although it is not as satisfactory because it tends to soften when contacted for any substantial length of time with a material such as petrolatum.

In making the synthetic rubber composition to be used according to this invention, various conventional compounding ingredients may be used if desired, such as zinc oxide, clay, various pigments such as white, red, brown, and other pigments, or oil-soluble dyes, waxes, non-volatile oils, curing agents such as sulfur and sulfur-yielding compounds, as well as various accelerators, anti-oxidants, etc.

The following formula is an example of the composition which has been found very suitable:

| | |
|---|---|
| Synthetic rubber [1] (non-staining) | 100 |
| Zinc oxide | 5 |
| Stearic acid | .75 |
| Sulfur | 2 |
| Benzothiazyldisulfide | 1 |
| Titanium dioxide | 50 |
| Wax | 2 |
| Du Pont orange OR #6 [2] | .3 |

[1] Butadiene-acrylonitrile containing 26% acrylonitrile.
[2] This may be replaced by .25 part of Du Pont's Orange F to give closer to a flesh color.

The filtering materials used inside the nasal filter of this invention, is preferably coil lambs' wool which has been coated with a thin film of petrolatum, such as by dipping the wool into a solution of about 1 to 10% by weight of petrolatum in a suitable volatile solvent such as a petroleum naphtha, and then allowing the solvent to evaporate. This leaves no odor but gives each fibre a thin coat of petrolatum, which is a solvent for protein, and for some types of dust and other particles, and is sticky enough to mechanically catch and retain even insoluble dust or other particles which might otherwise irritate the nasal passages. Instead of lambs' wool, other materials may be used such as very fine glass wool. Instead of petrolatum, other adhesive coating materials may be used such as water-insoluble polymers, e. g. polybutene of about 10,000 to 50,000 mol. wt.

The construction and design of a preferred modification, and several alternative modifications of the nasal filter of this invention will now be described, in connection with the accompanying drawing in which Fig. 1 shows a top view of a nasal filter for both the left and the right nostril, Fig. 2 shows a side elevation of one of the nasal filters, Fig. 3 shows an end view, Fig. 4, a top view of an alternative modification, and Fig. 5, a side elevation of a filtering material pad suitable for insertion into the nasal filter. In all figures, like parts are represented by like numerals, and the scale used is about two times the actual dimensions.

In Fig. 1, the left nasal filter 1 and the right nasal filter 2 are shown as having a substantially straight inner side wall 3 and curved outer side wall 4, the top surface itself having a number of cross-hatch openings 5 therein, which are preferably cut at an angle of about 30° to the upper horizontal edge of the straight inner side wall 3. The thin bars 6 left in between the cross-hatch openings 5 impart a very resilient and flexible construction to the nasal filter and adapted to make a close fit in nostrils of even widely varying inside contours. In preparing one model of the invention made in actual size, and which has given satisfactory results in service, the curvature of the outer side wall 4 has been made to correspond to an arc of a circle having a radius of 1¼ inch. The front end 7 is preferably rounded with a relatively narrow curvature, such as an arc having a radius of 3/32 inch. The rear portion 8 should have wider curvature such as an arc having a radius of 6/32 inch. These two suggested curvatures for the ends 7 and 8 are substantially those which should be used when the entire nasal filter has a length of about 26/32 inch. This leaves a longitudinal distance of 17/32 inch between the centers of the arcs of the ends 7 and 8. It will be understood that it is desirable to have nasal filters of various lengths as people differ considerably in the inner dimensions of the nostrils, and accordingly it is suggested that when these filters are made in larger or smaller sizes than the one specifically suggested above having an overall length of 26/32 inch, a suitable ratio for constructing the steel mould in which these synthetic rubber filters are moulded and cured, is:

radius of small arc at front/distance between centers of end arcs/radius of large arc at back=.12/.65/.23.

Referring to Fig. 2 it is seen that the upper corners of the ends 7 and 8 are preferably rounded, as with an arc of a 3/32 inch radius, both for ease of inserting the nasal filter in proper position in the nostril, and also for comfort by avoiding any sharp corners which might irritate the inner part of the nostril. On the other hand the lower edge of the ends 7 and 8 need not be rounded, and preferably are not. The inside edge of the filter may be substantially parallel with the outer edge along the top and all of the sides except that near the base there should be a filter mass retaining ridge 9. This should extend into the interior at least about 1/32 inch, and preferably slightly more such as 1/16 inch beyond the inside of the filter walls, which per se may have a thickness of about 1/32 inch to 1/16 inch, depending partly upon the overall size of the filter and upon the resiliency of the synthetic rubber composition used. The filter mass retaining ridge 9 should be located at or near the base of the filter, preferably having its innermost edge located about 1/16 inch from the base of the filter, as this helps to prevent the filter mass from being seen while in service. The overall height of the nasal filter is preferably about 10/32 inch although this may be varied some, for instance between the approximate limits of 1/8 inch and 3/8 inch, depending upon the overall length of the filter and upon the resiliency of the composition used.

Filter mass 10 which is placed inside the filter, is preferably made of coil lambs' wool which has been dipped in a solution of about 1 to 10%, depending on solubility, by weight of petrolatum in a volatile solution such as a petroleum naphtha. Other slightly heavier solvent fractions may be used such as a refined kerosene or a varnolene fraction which is intermediate between a naphtha and a kerosene, or other types of less inflammable solvents such as carbon tetrachloride, or any suitable mixed solvent. After the lambs' wool has been dipped into such a solution it should be dried, i. e. the solvent permitted to evaporate completely whereby a thin film of petrolatum is left on each of the tiny fibres of the lambs' wool. Other non-hardening water-insoluble adhesive materials free from undesirable odors or toxic vapor, may be used in place of the petrolatum, such as a viscous nonvolatile mineral oil fraction, e. g. heavy bright stock, low melting paraffin wax, some natural gums, and some slightly sticky synthetic polymers. The filter mass 10 may either be stuffed into the filter in any irregular manner, or may be pre-manufactured in the form of a thin pad of suitable thickness, which may then be cut out with a pair of scissors by the user, to fit the particular size filters to be used, or such pads may be pre-manufactured not only in the desired thickness but in the desired shape to fit filters of the various sizes. It is of course desirable that the filter mass fit reasonably snugly at the ends 7 and 8 of the filter so as to prevent passage of air without being filtered.

Fig. 3 representing an end view of the filter shows that the top corners of the inner and outer side walls 3 and 4 respectively should preferably be rounded for ease of insertion and for comfort. This figure also shows the filter mass retaining ridge 9 which protrudes inwardly from the side walls as well as from the ends as mentioned in describing Fig. 2. It is also apparent in Fig. 3 that the filter mass 10 should fit snugly with the side walls of the filter to prevent passage of air without filtering.

Fig. 4 shows a top view of an alternative modification of the invention in which the side walls 4 are both curved as in the case of the outer walls of the separate left and right filters described in Fig. 1. Thus, the filter of Fig. 4 is intended to be used in either the right or left nostril and is interchangeable. The cross-hatch openings 5 are shown as having a more rectangular shape due to the cross bars 6 being substantially at right angles to the longitudinal axis of the filter. However, it is not intended that this interchangeable shape of the nasal filter as a whole be limited to the use of this particular design of cross-hatch openings and cross bars, in other words in this type of filter one may use the slanting type of cross bars as in Fig. 1, or they may be made in any other suitable designs such as curved or V shaped, etc. to provide more resiliency. The general shape illustrated in Fig. 4 may be termed pear shaped for the sake of simplicity, while that in Fig. 1 may be called pear shaped on one side and straight on the other.

Fig. 5 shows a vertical section or side view of a suitable filter mass which may be pre-manufactured in the form of a pad in which the filter mass 10 is held between a lower sheet 11 and upper sheet 12 of pervious or open-weave textile material such as a light gauze which may or may not, as desired, be actually bonded to the lambs' wool with a suitable adhesive such as a gum or rubber adhesive, or a synthetic polymer of the polybutene type. If desired, only one of such supporting sheets may be used, in which case it is preferably the lower one 11, the upper one 12 being omitted.

In using the invention, it is preferable to renew the filter mass frequently enough to insure efficient removal of pollen from the air being inhaled by the user. During seasons when the air is particularly laden with rag weed pollen and other obnoxious pollens or dusts, it may be necessary to renew the filter mass as often as 2 or 3 times per day, but during other seasons it may not be necessary to change the filter mass more than once a day or even less frequently. It may be desirable at times to sterilize the filter, and this may be done by dipping it in alcohol or in boiling water, or it may be washed in hot soapy water, and rinsed.

It is not intended that this invention be limited specifically to the materials and modifications which have been given merely for the sake of illustration, but in the appended claims it is intended to claim all novelty inherent in the invention as well as all modifications coming within the scope and spirit of the invention.

I claim:

1. A nasal filter made of molded, flexible, and at least substantially elastic, non-toxic composition, having a top having cross-hatch openings which are positioned at an angle of about 20–60° from the cross-hatch axis of the filter, whereby a resiliency is imparted to the entire filter, both in a cross-wise direction and in a longitudinal direction, said filter also comprising a horizontal section substantially corresponding to the interior contour of the human nostril, the bottom of said filter being open, and the top having a number of cross-hatch openings amounting to at least about 40% of the top area of said filter.

2. Nasal filter made of moulded flexible elastic oil-insoluble synthetic rubber composition, having a wall thickness of about $\frac{3}{32}$ inch to $\frac{1}{16}$ inch, a substantially uniform side wall height of about $\frac{1}{8}$ inch to $\frac{3}{8}$ inch, a horizontal section substantially corresponding to the interior contour of the human nostril, the bottom of said filter being open, and the top having a number of cross-hatch openings amounting to at least about 40% of the top area of said filter, and said cross-hatch openings being positioned at an angle of about 20 to 60° from the crosswise axis of the filter, whereby a resiliency is imparted to the entire filter, both in a crosswise direction and in a longitudinal direction.

3. Filter according to claim 2 having inside thereof a filter mass comprising a loosely packed fibrous material composed of thin flexible and at least substantially resilient water-insoluble fibres coated with a thin film of non-volatile water-insoluble adhesive.

4. Filter according to claim 2 having a filter mass retaining ridge protruding from the inside walls at or near the bottom edge thereof.

5. Filter according to claim 2 having substantially pear shaped horizontal section on the side corresponding to the outer side of the nostril, and a substantially straight edge along the side corresponding to the inner side of the nostril.

6. Filter according to claim 2 having a substantially pear shaped horizontal section and being interchangeably adapted for use in either the right or left nostril.

7. Nasal filter substantially as described, made of moulded flexible elastic vulcanized synthetic rubber composition comprising a major proportion of oil-insoluble synthetic rubber made by polymerization of butadiene containing about 20 to 40% of acrylonitrile, said rubber composition also containing pigments and/or dyes to make the entire composition substantially flesh colored, said filter having a substantially uniform side wall height of about $\frac{5}{16}$ inch, a length of about $^{18}/_{32}$ to $^{30}/_{32}$ inch depending upon its intended size for different users, and having a horizontal section substantially pear shaped, at least one side having a concaved curvature and the other side being either straight or with concaved curvature, the front end having a narrow curvature and back and a wide curvature, the ratio of the radius of small arc at the front/distance between the centers of the front and back arc/radius of large arc at back end being about .12/.65/.23, the bottom of said filter being open and the top of said filter having a number of slantwise cross-hatch openings therein to permit ready passage of air through it during respiration, and to impart both longitudinal and crosswise resiliency to said filter, the top edges along the sides and at the ends being rounded, and there being a filter mass retaining ridge protruding from the inside surfaces of the walls at about $\frac{1}{32}$ inch to $\frac{1}{16}$ inch from the bottom edge.

8. A nasal filter assembly comprising a filter according to claim 7, containing therein a filter mass consisting of lambs' wool coated with a thin film of petrolatum.

CLARENCE L. McGOVNEY.

REFERENCES CITED

The following references are of record in the file of this patent:

UNITED STATES PATENTS

| Number | Name | Date |
|---|---|---|
| 2,192,093 | Moore | Feb. 27, 1940 |
| 2,274,886 | Carroll | Mar. 3, 1942 |